United States Patent [19]

Foladare et al.

[11] Patent Number: 5,920,805
[45] Date of Patent: Jul. 6, 1999

[54] TRANSMISSION OF NETWORK-CONNECTED DEVICE CONTROL INFORMATION OVER A SEPARATE CHANNEL

[75] Inventors: Mark Jeffrey Foladare, Kendall Park; Shelley B. Goldman, East Brunswick; Marie M. Juliano, Middletown; David Phillip Silverman, Somerville; Roy Philip Weber, Bridgewater, all of N.J.

[73] Assignee: AT & T Corp, Middletown, N.J.

[21] Appl. No.: 08/748,313

[22] Filed: Nov. 13, 1996

[51] Int. Cl.[6] .............................. H04L 9/00; H04Q 7/08; H04Q 7/10

[52] U.S. Cl. .................. 455/31.2; 455/426; 379/386; 340/825.44

[58] Field of Search ..................... 455/410, 417, 455/426, 445, 31.1, 31.2, 31.3, 38.1; 379/74, 77, 88.27, 102.01, 368; 340/825.44, 311.1; 380/49

[56] References Cited

U.S. PATENT DOCUMENTS

| | | | |
|---|---|---|---|
| 4,868,873 | 9/1989 | Kamil | 379/386 |
| 5,119,412 | 6/1992 | Attallah | 379/102.07 |
| 5,257,307 | 10/1993 | Ise | 455/31.3 |
| 5,305,370 | 4/1994 | Kearns et al. | 379/45 |
| 5,311,570 | 5/1994 | Grimes et al. | 455/417 |
| 5,315,634 | 5/1994 | Tanaka et al. | 455/31.2 |
| 5,369,697 | 11/1994 | Murray et al. | 379/386 |
| 5,428,663 | 6/1995 | Grimes et al. | 455/31.2 |
| 5,490,200 | 2/1996 | Snyder et al. | 455/31.2 |
| 5,491,739 | 2/1996 | Wadin et al. | 455/31.2 |
| 5,502,761 | 3/1996 | Duncan et al. | 379/142 |
| 5,581,594 | 12/1996 | McAfee | 455/31.2 |
| 5,588,038 | 12/1996 | Synder | 455/31.3 |
| 5,638,450 | 6/1997 | Robson | 380/49 |
| 5,790,949 | 8/1998 | Tognazzini | 455/426 |

Primary Examiner—Willis R. Wolfe

[57] ABSTRACT

A method and system for transmission of control information over a separate channel to devices connected to a telecommunications network. An outdial node couples a destination system to a user who is accessing the destination system using a first communications pathway through a telecommunications network. When the destination system requests control data be entered, the user causes a signal to be transmitted on a second communications pathway. The signal, which includes information identifying the user and the desired control function, is transmitted by the user from a two-way pager. The signal is received by a paging system and transmitted to the outdial node. The outdial node accesses a database using the user identifying information and selects an entry corresponding the user and to the control function. The control data contained in the selected entry is then output to the destination system.

25 Claims, 6 Drawing Sheets

TRANSMISSION OF NETWORK-CONNECTED DEVICE CONTROL INFORMATION OVER A SEPARATE CHANNEL

FIELD OF THE INVENTION

The present invention relates to telecommunications systems and more particularly relates to a method and system for transmission of control information over a separate channel to devices connected to a telecommunications network.

BACKGROUND OF THE INVENTION

Modern telecommunications networks provide access to many devices which may be controlled by a network user. For example, a caller on a telephone network may access and control voice messaging systems, information delivery systems, order taking systems and personal banking systems by using touch-tone signals sent over the telephone network. However, touch-tone signaling is not always available, particularly when rotary wireline telephone equipment is used. In other cases, touch-tone signaling is not desirable. For example, when a cellular phone is used, the signal may be intercepted and any information communicated by that signal may be obtained by unauthorized persons.

Figure 1:
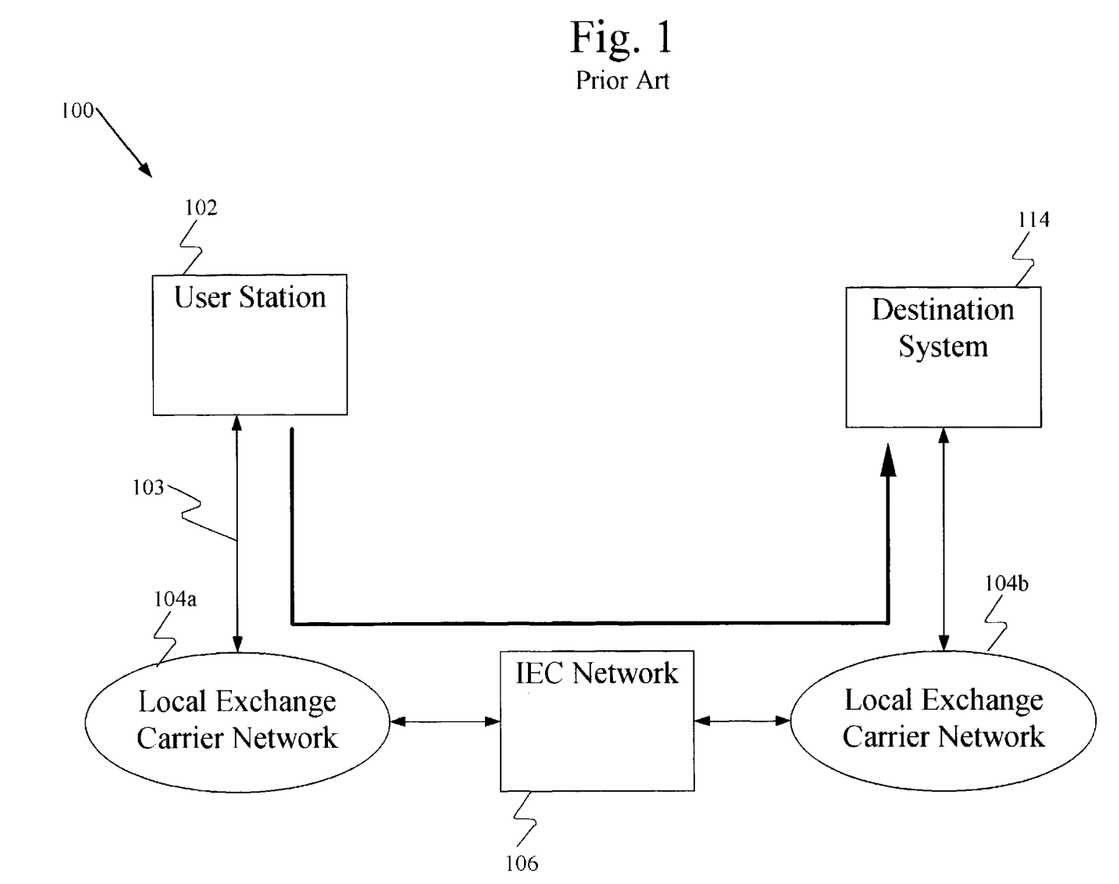
FIG. 1 is an exemplary block diagram of a conventional arrangement for controlling a destination system.

FIG. 1 is an exemplary block diagram of a conventional system 100 for controlling a destination system, such as an automated information delivery system, a voice mail system or a home banking system. User station 102 is conventionally connected to a local exchange carrier network (LEC) 104a over a link 103. As is well known, LEC 104a is connected to an inter-exchange carrier network 106, which is likewise connected to an LEC 104b. Destination system 114 is conventionally connected to LEC 104b.

A user who wishes to access and control destination system 114 places a call from user station 102 to destination system 114. User station 102 is typically a telephone, either landline or mobile. The call is connected to a local exchange carrier (LEC) network 104a over link 103. If the call is long distance, LEC 104a is connected to inter-exchange carrier (IEC) network 106. IEC network 106 routes and completes calls to and from IEC network 106 and LEC network 104b. Networks 104a and 104b may be the same network or different networks. If the call is not long distance the call may be routed entirely within a LEC network. In any case, the call is completed to destination system 114. The user then transmits signals, which typically are touch-tones generated by pressing digits of the telephone, to control destination system 114. For example, the user may step through the menus of an information delivery system, operate a voice mail system or perform transactions in a home banking system.

However, problems arise with system 100. If user station 102 is a rotary telephone, no touch-tones are available and the user is unable to control the destination system. If user station 102 is a mobile telephone, link 103 includes a wireless channel, which is susceptible to interception by unauthorized persons. Thus, for security reasons, it may be undesirable to transmit touch-tone signals over a cellular phone channel. Consequently, what is needed is a way to transmit signals to control network connected devices which is secure and is always available

SUMMARY OF THE INVENTION

The present invention overcomes the problems of security and availability in controlling network-connected devices by transmitting control signals over a secure and available secondary communications pathway. An outdial node is provided which couples a destination system to a user who is accessing the destination system using a first communications pathway through a telecommunications network. When the destination system requests control data be entered, the user causes a signal to be transmitted on a second communications pathway. The outdial node translates the signal into control data and outputs it to the destination system.

In a preferred embodiment, the signal, which includes information identifying the user and the desired control function is transmitted by the user from a two-way pager. The signal is received by a paging system and transmitted to the outdial node. The outdial node accesses a database using the user identifying information and selects an entry corresponding the user and to the control function. The control data contained in the selected entry is then output to the destination system.

BRIEF DESCRIPTION OF THE DRAWINGS

FIG. 2c is a more detailed block diagram of an outdial node 108, shown in FIG. 1a.

FIG. 3 is a flow diagram of a separate channel touch-tone transmission process, implemented in the system of FIG. 2a.

DETAILED DESCRIPTION OF THE INVENTION

Figure 2A:
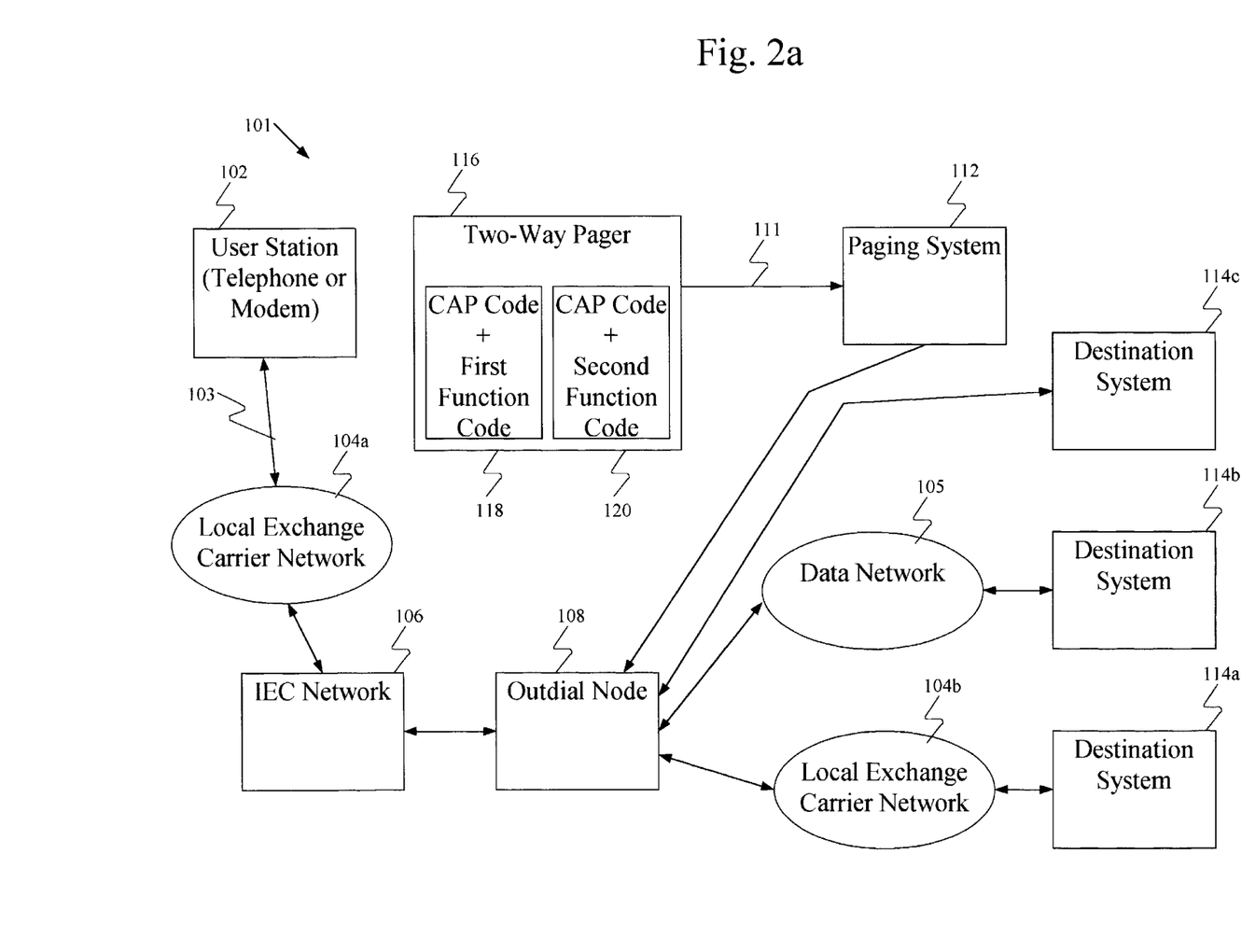
FIG. 2a is a block diagram of a separate channel touch-tone transmission system 101, according to the present invention.

A system 101 for controlling a destination system, according to the present invention, is shown in FIG. 2a. System 101 includes a user station 102, which is connected to LEC 104a over link 103. As is well-known, LEC 104a is connected to IEC 106. IEC 106 is connected to outdial node 108. Outdial node 108 may be connected to a variety of destination systems using a variety of connection types. For example, each of destination systems 114a–c is connected to outdial node 108 using a different connection type.

Destination system 114a is connected through a telephone network. The details of the connection may vary. For example, destination system 114a is shown connected to outdial node 108 through LEC 104b alone, as may be the case if both outdial node 108 and destination system 114a were served by the same local exchange carrier. In other cases, destination system 114a may be connected to outdial node 108 through IEC network 106 and LEC network 104b. Destination system 114b is connected to outdial node 108 through a data network 105, such as a local or wide area network. Destination system 114c is directly connected to outdial node 108.

Two-way pager 116 is coupled by radio-frequency pager link 111 to paging system 112. Paging system 112 is connected to outdial node 108.

A user who wishes to access and control a destination system, using outdial node 108, places a call from user station 102 to outdial node 108. User station 102 is typically a telephone, either landline or mobile. The call is connected to a local exchange carrier (LEC) network 104a over link 103. LEC 104a is connected to inter-exchange carrier (IEC) network 106. IEC network 106 routes and completes the call to outdial node 108. The user then commands the outdial node to access the destination system. The way in which the destination system is accessed depends upon the way in which the destination system is connected to outdial node 108.

In one embodiment, the destination system is connected to outdial node 108 through a telephone network, as is destination system 114a. Destination system 114a may be connected to outdial node 108 through IEC network 106 and LEC network 104b or through LEC network 104b alone. In this embodiment, outdial node 108 places a call to destination system 114a and bridges that call to the call received from the user. The user is then in two-way telephonic communication with destination system 114a through outdial node 108 and can transmit tones or voice and receive audio prompts, such as tones or voice prompts, from destination system 114a.

In another embodiment, destination system 114b is connected to outdial node 108 through a data network 105, such as a local or wide area network. In this embodiment the user is in two-way telephonic communication with outdial node 108. In a well-known manner, outdial node 108 translates tone or voice input from the user to the appropriate data messages and transmits the messages to destination system 114b. Likewise, outdial node 108 receives data messages from destination system 114b, translates the messages to audio prompts, such as voice prompts or tones, and transmits the audio prompts to the user.

In another embodiment, destination system 114a is directly connected to outdial node 108, either by an audio connection or by a data connection. If the connection is an audio connection, the user is in two-way telephonic communication with destination system 114a through outdial node 108 and can transmit tones or voice and receive audio prompts, such as tones or voice prompts from destination system 114a. If the connection is a data connection, outdial node 108 translates tone or voice input from the user to the appropriate data messages and transmits the messages to destination system 114a. Likewise, outdial node 108 receives data messages from destination system 114a, translates the messages to audio prompts, such as voice prompts or tones, and transmits the audio prompts to the user.

The communication pathway which includes link 103 is no more secure than in the prior art. However, the present invention includes a second communication pathway which is secure. This secure communication pathway uses a two-way pager 116, which is operated by the user. Pager 116 is in two-way communication with paging system 112 over link 111. Link 111 is one or more radio frequency channels over which signals are transmitted between pager 116 and paging system 112, as is well-known.

Pager 116 is capable of transmitting signals, such as the signals indicated by blocks 118 and 120, which are selected by the user. Signals 118 and 120 each have a CAP code portion and a function code portion. Typically, the user selects which signal is transmitted by pressing one or more buttons on pager 116. The CAP code portion of a signal identifies the pager and is unique from pager to pager within a particular paging system network. Thus, a CAP code can be used to uniquely identify the user who has the pager. The function code portion of the signal identifies which function was selected.

Paging system 112 is connected to outdial node 108, in order to communicate data which is needed to carry out the present invention. Although not shown, paging system 112 is typically connected to a plurality of outdial nodes, when there are a plurality of outdial service providers available.

Figure 2B:
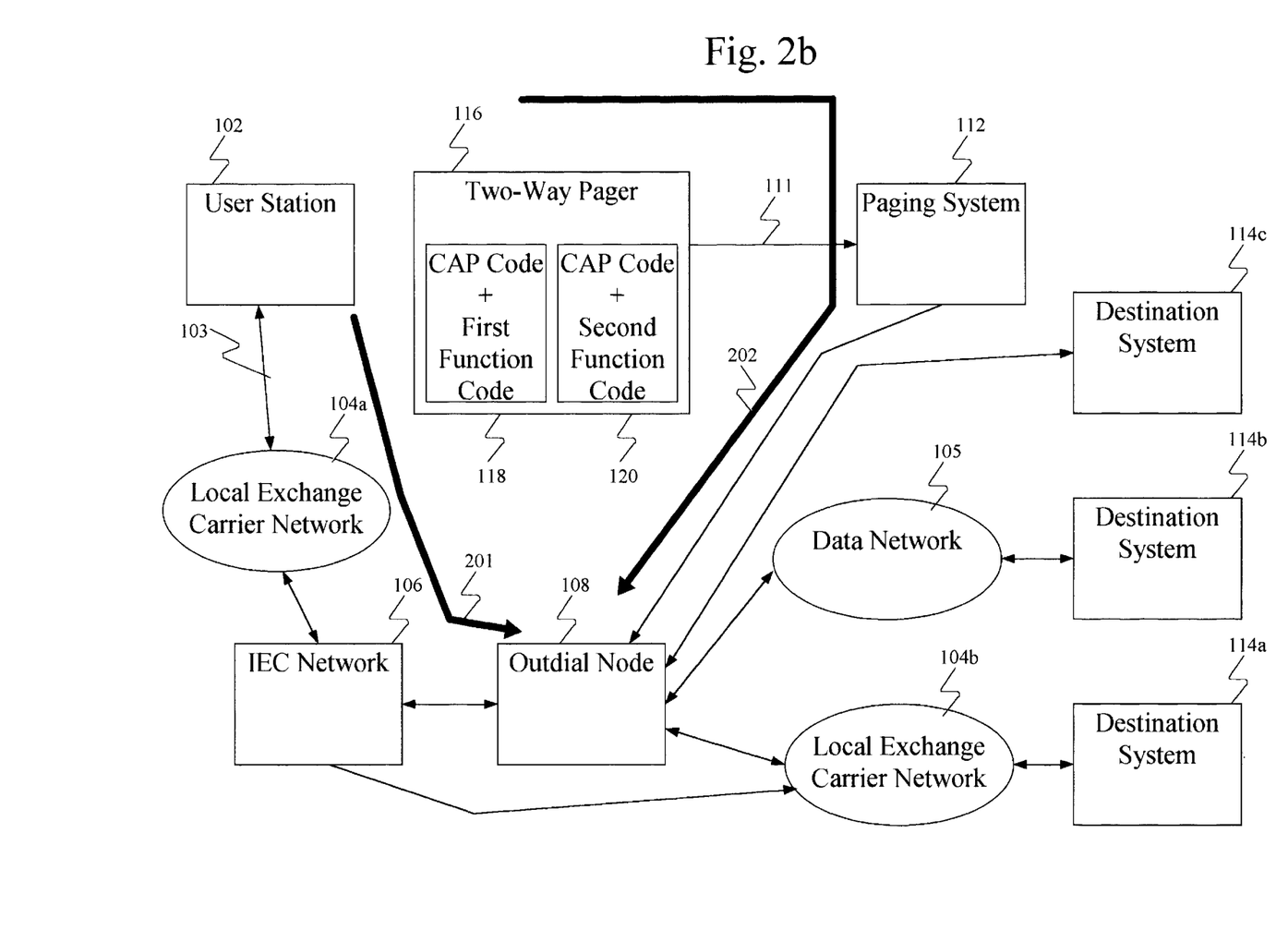
FIG. 2b is a block diagram of a separate channel touch-tone transmission system, according to the present invention, showing the two communication pathways which are used.

The two communication pathways provided by the present invention are shown explicitly in FIG. 2b as 201 and 202. Pathway 201 starts at user station 102, proceeds through link 103, through LEC network 104a and through IEC network 106 to outdial node 108. Pathway 202 starts at pager 116, proceeds through link 111 and through paging system 112 to outdial node 108.

Figure 2C:
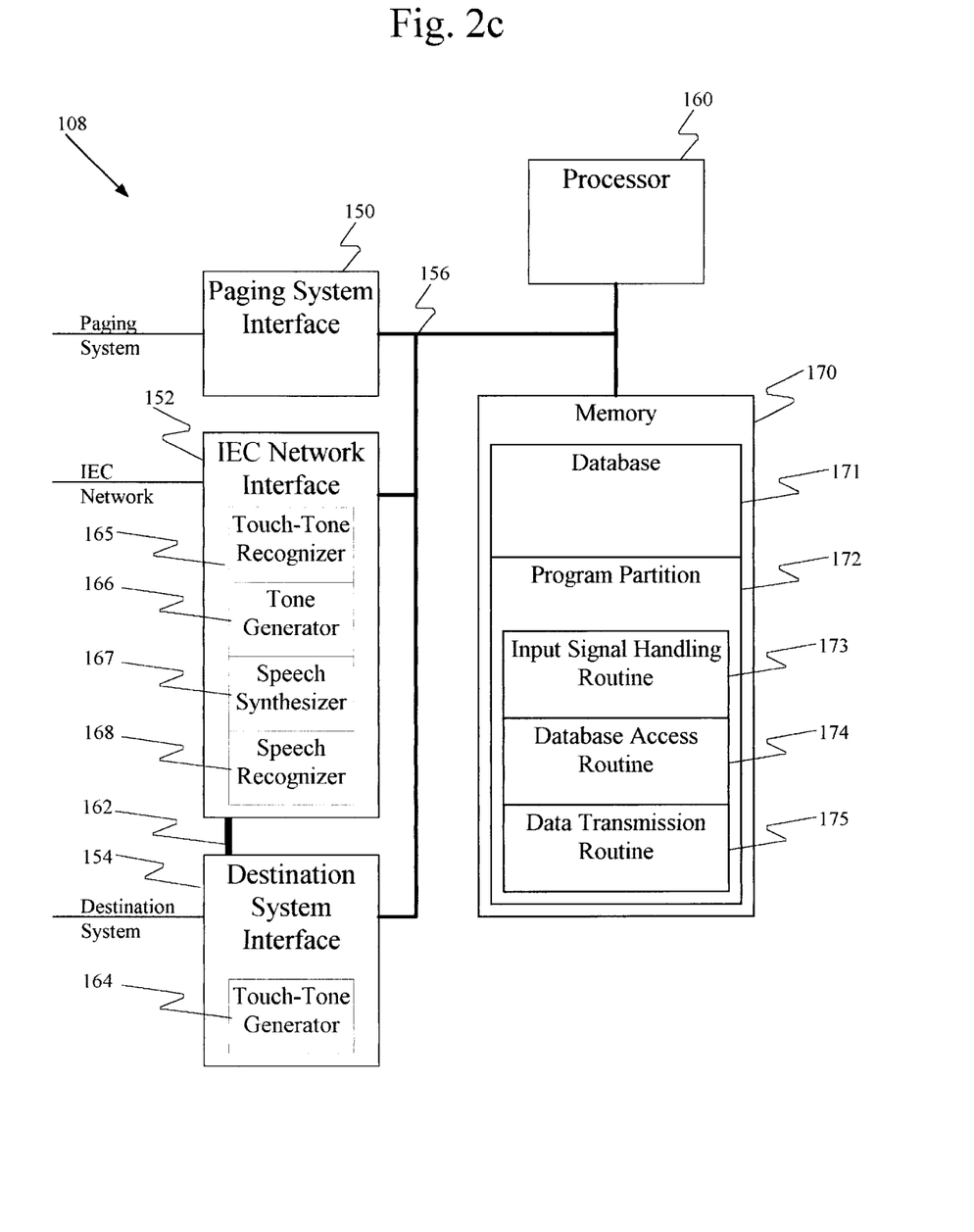

Outdial node 108 is shown in more detail FIG. 2c. Outdial node 108 includes a processor 160, a memory 170, a paging system interface 150, an IEC network interface 152 and a destination system interface 154, all connected by bus 156. In addition, IEC network interface 152 is connected to destination system interface 154 by link 162.

Paging system interface 150, which is coupled to paging system 112 of FIG. 2a, receives data from the paging system and communicates it to processor 160 over bus 156. IEC network interface 152, which is coupled to IEC network 106 of FIG. 2a, communicates audio and data with the IEC network. IEC network interface 152 communicates the data with processor 160 over bus 156 and couples the audio to destination system interface 154 over link 162. Destination system interface 154 is in turn coupled to one or more destination systems 114a–c of FIG. 2a. IEC network interface also includes several devices which are under the control of processor 160. Touch-tone recognizer 165 recognizes touch-tones input by the user and converts them to data signals, in a well-known manner. Tone generator 166 generates tones for communicating information to the user in the form of tones, in a well-known manner. Speech synthesizer 167 generates synthesized speech for communicating information to the user, in a well-known manner. Speech recognizer 168 recognizes speech from the user and converts the recognized speech to data signals in a well-known manner.

Destination system interface 154 communicates audio and data with the destination system and data with processor 160 over bus 156. Link 162 allows IEC network interface 152 and destination system interface 154 to intercommunicate audio between the IEC network and the destination system. IEC network interface 152 and destination system interface 154 can control the connection over link 162 to be bridged, allowing two-way communication, unbridged, allowing no communication, or muted in either direction by allowing one-way communication in the appropriate direction. In addition, destination system interface 154 includes touch-tone generator 164, which, under control of processor 160, generates touchtone signals which are output to the destination system.

Processor 160 controls the operation of the other elements of outdial node 108. Preferably, processor 160 is a programmed general-purpose computer, but it may also be implemented in a dedicated computer, a micro-controller, discrete or integrated logic, etc., as is well-known in the art. Processor 160 communicates with memory 170 over bus 156. Memory 170 is accessible by processor 160 and stores program instructions and data necessary for the operation of processor 160.

Memory 170 may be one or more of a number of well-known devices, such as random access memory, read-only memory, erasable read-only memory, hard disk drives, floppy disk drives, tape drives, optical drives, etc. Memory 170 includes program partition 172, which includes several routines. Input signal handling routine 173 implements the processing of input signals from users and from paging systems. Database access routine 174 implements the accessing of database 171 and the retrieval of information therefrom. Data transmission routine 175 implements the transmission of data in and out of outdial node 108. Database 171 stores and accesses the data used by outdial node 108 in providing outdial services.

Figure 3:
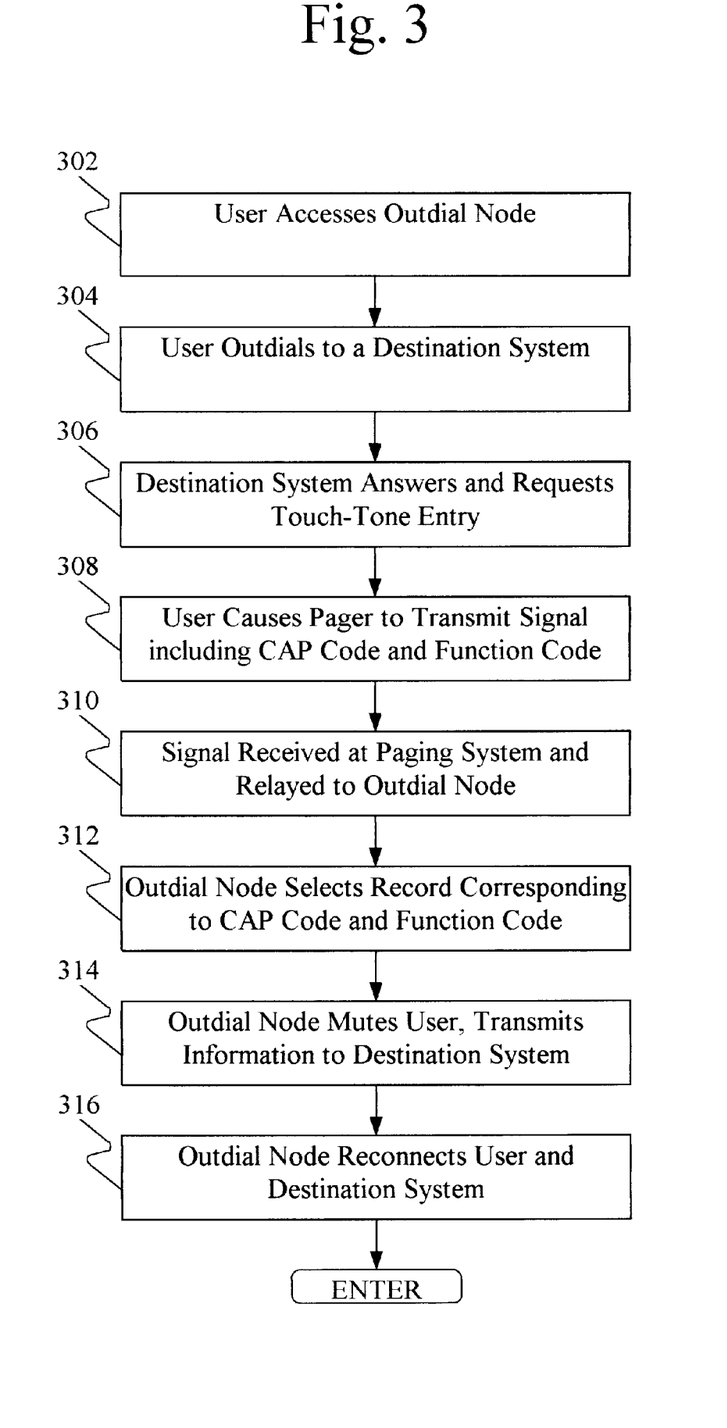

FIG. 3, which is best viewed in conjunction with FIG. 2b, is a flow diagram of a secure transmission process, in accordance with the present invention. The process begins with step 302, in which a user operating user station 102 accesses the outdial node using the user's outdial node access number. The access number is typically a special service telephone number, such as an "800" number. This call is received by local exchange carrier (LEC) network 104a. LEC 104a recognizes the call as a special service call, typically from the area code. A standard telephone number is geographically based and provides sufficient information for the call to be routed. However, a special service telephone number, such as an "800" number, is not geographically based. LEC 104a must access a routing database using the dialed number and obtain the necessary routing information. In the present invention, LEC 104a routes the call from the user to the outdial node 108 belonging to the user's outdial service provider.

In step 304, the user uses outdial node 108 to originate a call to a destination system 114. In one embodiment, this call would be a voice call through a telephone network. In this embodiment, once the call to the destination system is completed, the outdial node bridges the user's call to call to the destination system. This bridge is established by setting link 162 of FIG. 2c to bridge the call from the user to the call to the destination system.

In another embodiment, a data connection to the destination system is established. In this embodiment, the user's call is connected to touch-tone recognizer 165 and/or speech recognizer 168, and tone generator 166 and/or speech generator 168, which translate input from the user to data and data from the destination system to tone or speech.

In step 306, the destination system answers the call and requests entry of information, such as access codes, personal identification numbers, function selections, account numbers, etc. In the prior art, if the call were a voice call, the user would enter the requested information by transmitting touch-tone signals keyed in from the keypad of the telephone. If the user is using a rotary telephone, the user is unable to enter the requested information. If the user is using a mobile phone, such as a cellular phone, this poses a security risk, since the mobile phone signal may be intercepted and the information captured by unauthorized parties. In the prior art, if the call contained data, the user would enter login data which would be transmitted over the voice channel. Again, if the user is using a mobile phone, this data could be intercepted.

In the present invention, the user responds to the request for information at step 308, by causing pager 116 to transmit a signal including a CAP code, which identifies user 102, and a function code, which indicates which function the user selected. Typically, the user does this by pressing one or more buttons on the pager. The pager does not actually transmit the requested information.

In step 310, paging system 112 receives the signal transmitted by pager 116 and relays the received CAP code and function code to outdial node 108. In step 312, outdial node 108 accesses database system 171 and selects the database record corresponding to the received CAP code and function code. The CAP code identifies the user, and the function code identifies the function to be performed. Thus, the selected record contains the desired information which is to be transmitted to the destination system. In step 314, outdial node 108 mutes the audio channel to user 102, accesses the record selected in step 312, obtains the desired information and plays the appropriate touch-tones or transmits the appropriate data signals to enter the information into the destination system. The audio channel to the user is muted by setting link 162 appropriately. This prevents the touch-tone signals from being transmitted over the mobile phone channel, which would subject them to interception. Once the information has been entered, the outdial node, in step 316, reconnects the user and the destination system, so that the user may continue accessing the destination system.

Figure 4:
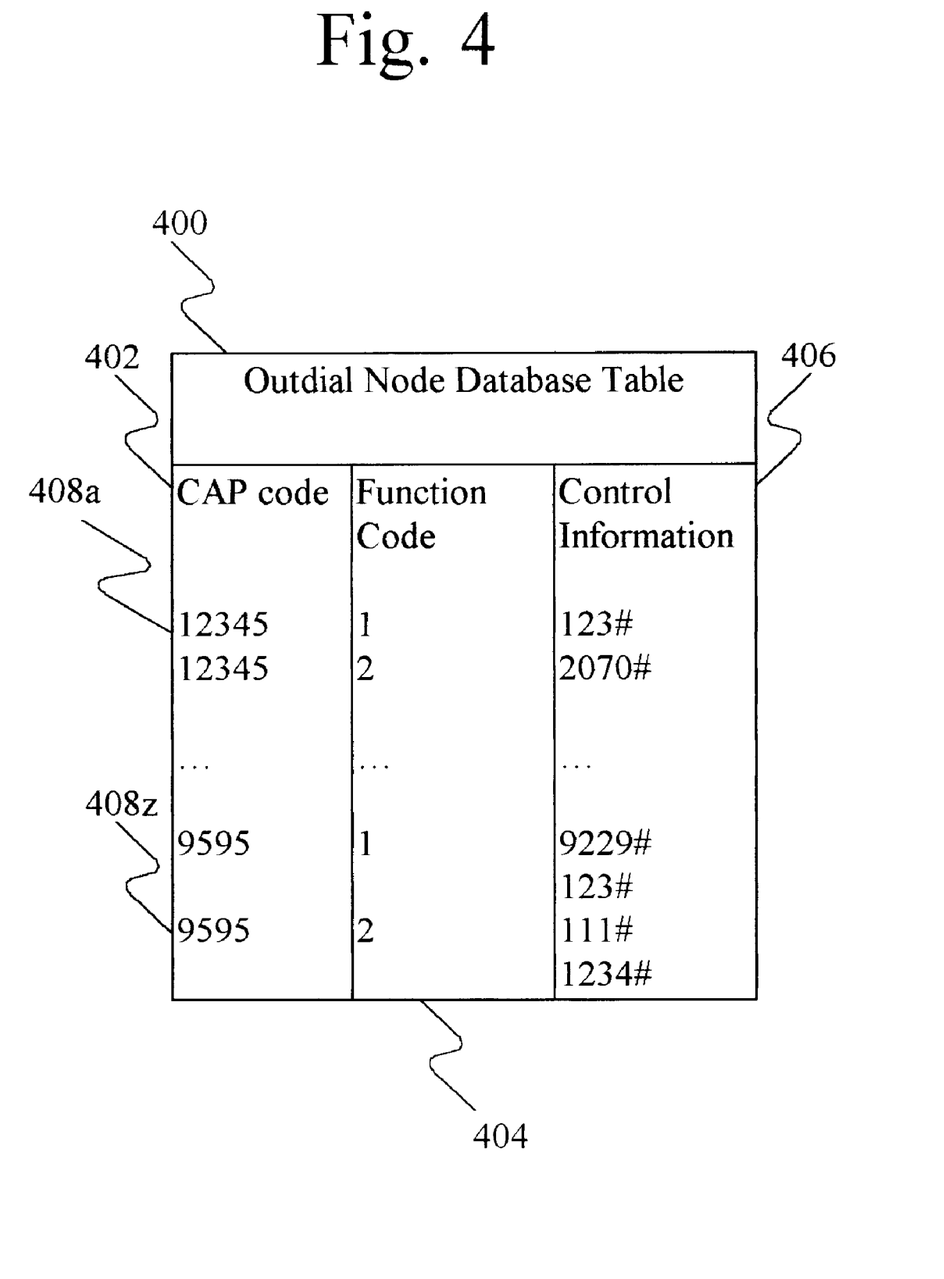
FIG. 4 is an exemplary format of an outdial node database table, which is stored in memory 170 of outdial node 108, shown in FIG. 2c.

Referring to FIG. 4, the format of the outdial node database table 400, which is contained by outdial node database 171, is shown. Table 400 includes a plurality of records 408a–z. Each record includes three fields, CAP code field 402, function code field 404 and control information field 406. Using well-known database access techniques, outdial node 108 accesses table 400, using the received CAP code and function code as keys. The corresponding record is selected and the contents of the record's control information field 402 is output.

Although a specific embodiment has been described, other embodiments are possible. For example, although a two-way pager has been described as providing the secondary communication channel, the secondary channel may be provided by any medium which is fast enough to provide reasonable performance to the user. In addition, the outdial node may perform any touch-tone function the user desires. For example, in response to a received signal from the secondary channel, the outdial node may not only output control information, it may also dial a destination system itself. As another example, the user may command the outdial node to place calls to other individuals, conference calls, send voice mail messages, etc. The present invention is adaptable to perform any function which can now or could in the future be performed by sending touch-tones or data. For example, the outdial node could be connected to an e-mail system and secondary channel commands could cause the e-mail messages to be originated, forwarded, stored, deleted, or even translated to speech and played to the user.

What is claimed is:

1. A method of secure transmission of control information to a destination system comprising the steps of:

establishing communications with a first user station, using a first communication pathway;

establishing communications with the destination system;

receiving a request for control information from the destination system;

transmitting the received request for control information to the user station over the first communication pathway;

receiving a signal from a second user station, using a second communication pathway, the signal including an indicator of control information; and transmitting the indicated control information to the destination system.

2. The method of claim 1, further comprising the step of preventing the control information from being transmitted over the first communication pathway.

3. The method of claim 1, wherein the second user station is a two-way pager and the second communication pathway includes a paging channel.

4. The method of claim 1, wherein the signal includes an indicator of a user and an indicator of a function to be performed.

5. The method of claim 4, wherein the step of transmitting the indicated control information comprises the steps of:

determining the control information based on the indicated user and function to be performed, and transmitting the determined control information.

6. The method of claim 5, wherein the step of determining the control information comprises the steps of:

accessing a database containing a plurality of records, each record comprising user information, function information, and control information for the destination system; and selecting the record corresponding to the indicated user and the indicated function.

7. The method of claim 1, wherein the first user station is a telephone and the first communication pathway is an audio channel established by placing a telephone call from the first user station.

8. The method of claim 7, wherein the destination system is coupled to the outdial node by an audio channel.

9. The method of claim 8, wherein the step of transmitting the indicated control information comprises the step of transmitting the control information to the destination system using a touch-tone signal.

10. The method of claim 9, further comprising the step of preventing the control information from being transmitted over the first communication pathway.

11. The method of claim 7, wherein the destination system is coupled to the outdial node by a data channel.

12. The method of claim 11, wherein the step of transmitting the indicated control information comprises the step of transmitting the control information to the destination system using a data signal.

13. The method of claim 12, wherein the received request for control information is a data signal and the step of transmitting the received request for control information comprises the steps of:

translating the received data signal to an audio prompt; and transmitting the audio prompt to the user station.

14. An outdial system for transmitting control information from a user to a destination system, the outdial system coupled to a first user station over a first communication pathway, to a second user station over a second communication pathway and to the destination system, the outdial system comprising:

a first receiver receiving a request for control information from the destination system;

a first transmitter transmitting the received request for control information to the first user station;

a second receiver receiving a signal including an indicator of control information from the second user station; and a second transmitter transmitting the indicated control information to the destination system.

15. The system of claim 14, further comprising a device which prevents the control information from being transmitted over the first communication pathway.

16. The system of claim 14, wherein the second user station is a two-way pager and the second communication pathway includes a paging channel.

17. The system of claim 14, wherein the signal includes an indicator of a user and an indicator of a function to be performed.

18. The system of claim 17, further comprising a database comprising a plurality of records, each record comprising user information, function information and control information for the destination system, the database receiving the signal from the second receiver, selecting the record corresponding to the indicated user and function, and transmitting the indicated control information to the second transmitter.

19. The system of claim 14, wherein the first user station is a telephone and the first communication pathway is an audio channel established by placing a telephone call from the first user station.

20. The system of claim 19, wherein the destination system is coupled to the outdial system by an audio channel.

21. The system of claim 20, wherein the second transmitter comprises a touch-tone signal transmitter.

22. The system of claim 21, further comprising a device which prevents the control information from being transmitted over the first communication pathway.

23. The system of claim 19, wherein the destination system is coupled to the outdial system by a data channel.

24. The system of claim 23, wherein the second transmitter comprises a data signal transmitter.

25. The system of claim 24, wherein the first receiver comprises a data signal receiver receiving the request for control information and the first transmitter comprises a translation device translating the received request to an audio prompt.

\* \* \* \* \*